US011824362B2

(12) United States Patent
Abdelhakim et al.

(10) Patent No.: US 11,824,362 B2
(45) Date of Patent: Nov. 21, 2023

(54) MODULAR GRID-CONNECTED FLYWHEEL SYSTEM

(71) Applicant: ABB Schweiz AG, Baden (CH)

(72) Inventors: Ahmed Abdelhakim, Västerås (SE); Haofeng Bai, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/757,275

(22) PCT Filed: Dec. 19, 2019

(86) PCT No.: PCT/EP2019/086164
§ 371 (c)(1),
(2) Date: Jun. 13, 2022

(87) PCT Pub. No.: WO2021/121591
PCT Pub. Date: Jun. 24, 2021

(65) Prior Publication Data
US 2023/0006447 A1 Jan. 5, 2023

(51) Int. Cl.
*H02J 3/30* (2006.01)
*H02J 3/24* (2006.01)
(Continued)

(52) U.S. Cl.
CPC .............. *H02J 3/30* (2013.01); *H02J 3/241* (2020.01); *H02J 15/007* (2020.01); *H02M 7/5387* (2013.01)

(58) Field of Classification Search
CPC ............ H02J 3/30; H02J 3/241; H02J 15/007; H02M 7/5387
(Continued)

(56) References Cited

U.S. PATENT DOCUMENTS 9,276,425 B2 * 3/2016 Ture ..................... H02J 3/381
10,541,433 B2 * 1/2020 Patel ................... H01M 8/0681
(Continued)

FOREIGN PATENT DOCUMENTS

CN 102751719 B 9/2014
CN 106533234 A 3/2017
(Continued)

OTHER PUBLICATIONS

Nowak, Mieczyslaw; et al.; "Converters with AC transformer intermediate link suitable as interfaces for supercapacitor energy storage"; 2004 IEEE 35th Annual Power Electronics Specialists Conference (IEEE Cat. No. 04CH37551), vol. 5; Aachen, Germany; Jun. 20, 2004; 7 Pages.
(Continued)

*Primary Examiner* — Hal Kaplan
(74) *Attorney, Agent, or Firm* — WHITMYER IP GROUP LLC

(57) ABSTRACT

A frequency support system arranged for providing frequency support to an AC grid. The system includes an ES arrangement, and a bi-directional DC/AC power electronic converter interface configured for connecting the ES arrangement with the grid. The ES arrangement includes a plurality of series connected ES groups, each ES group including a plurality of parallel connected ES modules, each ES module including an energy storage interfaced by a bi-directional power electronic ES converter configured for connecting the ES with a DC side of the converter interface.

17 Claims, 1 Drawing Sheet

(51) Int. Cl.
  *H02J 15/00* (2006.01)
  *H02M 7/5387* (2007.01)
(58) Field of Classification Search
  USPC .......................................................... 307/82
  See application file for complete search history.

(56) References Cited

U.S. PATENT DOCUMENTS

| 2014/0184136 A1 | 7/2014 | Ture |
| 2018/0254498 A1 | 9/2018 | Patel et al. |

FOREIGN PATENT DOCUMENTS

| CN | 207069596 U | 3/2018 |
| CN | 207603229 U | 7/2018 |
| CN | 108493968 A | 9/2018 |
| WO | 2014181081 A1 | 11/2014 |
| WO | 2015003729 A1 | 1/2015 |

OTHER PUBLICATIONS

Murayama, Masamichi, et al.; "Combination of Flywheel Energy Storage System and Boosting Modular Multilevel Cascade Converter"; IEEE Transactions on Applied Superconductivity, vol. 28, Issue: 3; Apr. 2018; 4 Pages.

International Preliminary Report on Patentability; Application No. PCT/EP2019/086164; dated Apr. 4, 2022; 13 Pages.

International Search Report and Written Opinion of the International Searching Authority; Application No. PCT/EP2019/086164; Completed: Sep. 11, 2020; dated Sep. 21, 2020; 17 Pages.

Wikipedia; "Utility Frequency"; https://en.wikipedia.org/wiki/Utility_frequency; Retrieved on Nov. 9, 2020; 12 Pages.

Daoud, Mohamed I.; et al.; "A Dual Three-Phase Induction Machine Based Flywheel Storage System Driven by Modular Multilevel Converters for Fault Ride Through in HVDC Systems"; 2015 IEEE PES Asia-Pacific Power and Energy Engineering Conference (APPEEC); Brisbane, QLD, Australia, Nov. 15, 2015, 5 Pages.

* cited by examiner

MODULAR GRID-CONNECTED FLYWHEEL SYSTEM

TECHNICAL FIELD

The present disclosure relates to a system and method for power electronic frequency support of a frequency of an Alternating Current (AC) power grid by means of Energy Storage (ES) and a power electronic interface between the ES and the grid.

BACKGROUND

With the higher penetration of power electronics-interfaced renewable energy sources, such as wind and solar, a potential need for increased active power support for grid frequency stability is foreseen. This active power support implicates the usage of energy storage to buffer the imbalance between the generation and load, and mitigate the frequency excursions. Energy storage for short-term active power support is an interesting application since it is effective in reducing the Rate of Change of Frequency (RoCoF) and limiting the frequency deviations.

Kinetic energy storage is a well-established technology for short-term active power support. Compared to battery and super-capacitor, it has the advantages of long lifetime and lower impacts on the environment. One drawback is the high self-discharge rate due to the mechanical friction in e.g., ball bearings. However, with the use of magnetic bearings, this problem can be mitigated.

For utility applications, the following configurations of kinetic energy storage systems can be found:

Conventional synchronous condenser: this option is rotating at synchronous speed and is connected directly to the grid or via a transformer. It is able to provide reactive power, active power, and short circuit contribution. However, the reactive power response is voltage dependent and relatively slow, while the active power response is dependent on RoCoF and the seen frequency deviation.

Power electronics-interfaced synchronous condenser: this option is rotating at various speeds (resulting in better energy utilization), utilizes a converter for the interface (usually a back-to-back converter, but a matrix converter also possible), and can give reactive/active power support with relatively fast response. A shortcoming is the limited short circuit contribution. A bypass switch can be used to enhance the short circuit contribution and benefit from the merits of the conventional synchronous condenser.

SUMMARY

It is an objective of the present invention to provide an improved energy storage system for frequency support (i.e., active power support) for an AC power grid.

According to an aspect of the present invention, there is provided a frequency support system arranged for providing frequency support to an AC grid. The system comprises an ES arrangement, and a bi-directional DC/AC power electronic converter interface configured for connecting the ES arrangement with the grid. The ES arrangement comprises a plurality of series connected ES groups, each ES group comprising a plurality of parallel connected ES modules, each ES module comprising an energy storage (ES) interfaced by a bi-directional power electronic ES converter configured for connecting the ES with a DC side of the converter interface.

According to another aspect of the present invention, there is provided a method of providing frequency support to an AC grid. The method comprises, by means of an embodiment of the frequency support system of the present disclosure, transferring electrical energy between the ES arrangement and the grid via the converter interface, to support an AC frequency of the grid.

By using a plurality of ES modules, each comprising its own respective ES converter, ES arrangements may be more flexibly provided. For instance, the number of series connected ES groups may be adapted to the desired maximum output voltage. Also, redundancy is obtained by parallel connection of the ES modules in each ES group. Further, a smaller spatial footprint may be obtained compared with use of a conventional back-to-back AC-DC-AC converter.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
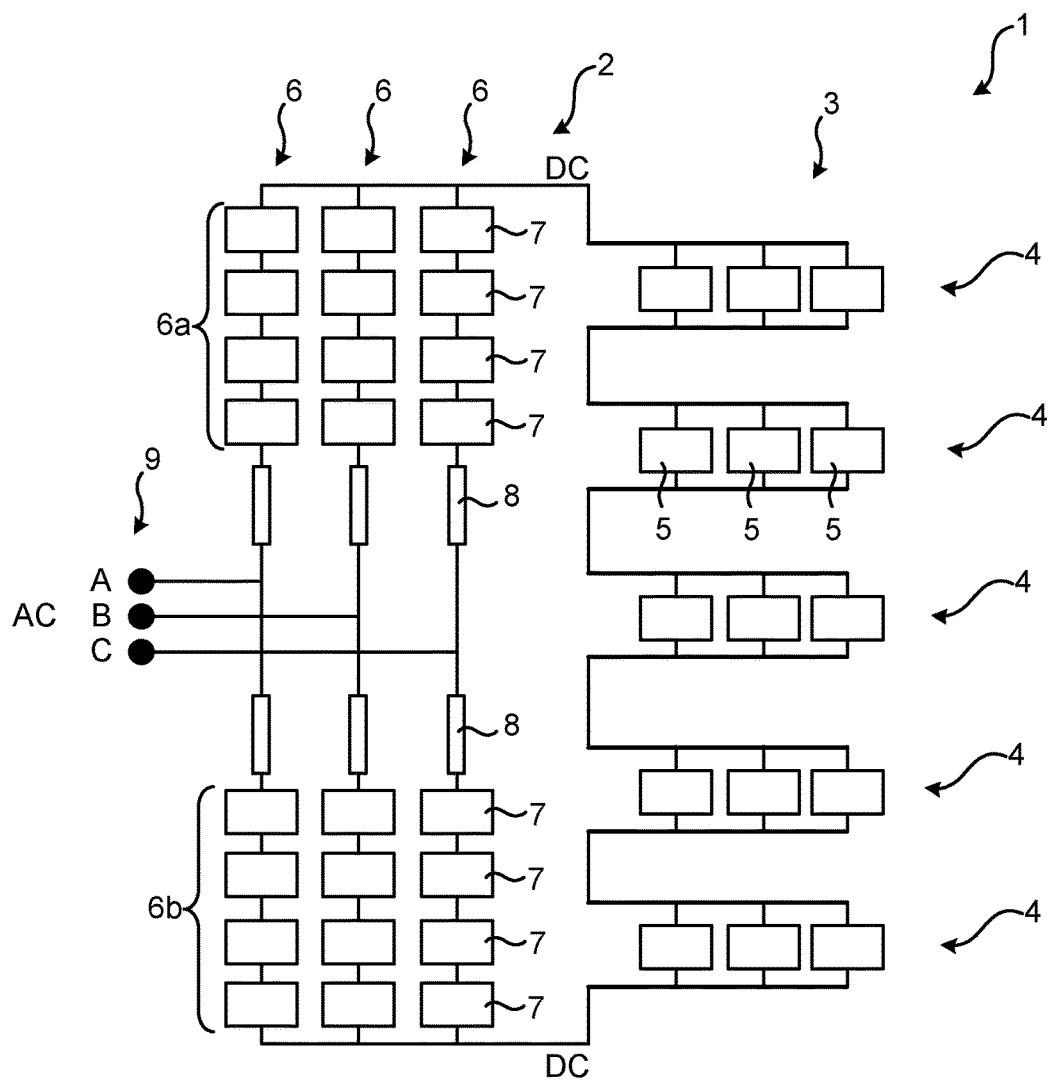
FIG. 1 is a schematic circuit diagram of an embodiment of a frequency support system of the present invention.

FIG. 1 illustrates an embodiment of a frequency support system 1 of the present invention. The system 1 comprises an ES arrangement 3 and converter interface 2, interfacing the ES arrangement 3 with the AC power grid 9.

The grid 9 may be a three-phase grid, as in FIG. 1, having the three phases A, B and C. The grid may be configured for any nominal voltage, and may thus be e.g. a High-Voltage (HV), Medium-Voltage (MV) or Low Voltage (LV) grid 9.

The converter interface 2 is bi-directional, allowing active power to be both transferred from the ES arrangement 3 to the grid 9 and from the grid 9 to the ES arrangement 3. The converter interface 2 is a DC/AC converter, having an Alternating Current (AC) side connected to the AC grid 9 and a Direct Current (DC) side connected to the ES arrangement 3. The converter interface 2 comprises a power electronic converter, which may thus act either as a rectifier or an inverter, depending on the direction of the active power transfer.

The converter of the converter interface 2 may have any suitable topology, e.g., depending on the nominal voltage of the grid 9. For instance, for an LV grid, a three-level or two-level converter may be preferred, while for a HV grid, and possibly also for a MV grid, a Modular Multilevel Converter (MMC), comprising a plurality of series connected converter cells, may be preferred. In the example of FIG. 1, an MMC with a double-star (also called double-wye or double-Y) topology is used in the converter interface 2. The MMC comprises a plurality of series-connected converter cells 7 for each phase A, B and C, for handling the relatively high voltages therein. The MMC with a double-star topology, as shown in FIG. 1, comprises one phase leg 6 for each of the phases A, B and C of the grid 9. Each phase leg comprises an upper branch 6a and a lower branch 6b, the phase A, B and C, respectively, being connected to the phase leg 6 between the upper and lower branches 6a and 6b. Each branch 6a and 6b comprises a plurality of series connected converter cells 7 (here four, but any suitable number may be used depending on e.g., the nominal voltage of the grid and the voltage ratings of the cells). A phase reactor 8, or the like, may be provided in series with each branch.

The ES arrangement 3 comprises a plurality of ES modules 5 arranged in a plurality of ES groups 4 such that the ES modules 5 within each group are connected in parallel with each other and the groups 4 are connected in series with each other. The parallel connection of ES modules give redundancy in case of a fault in any one of the parallel connected modules. The ES arrangement may thus keep operating with a faulty (typically disconnected) ES module 5, e.g. till a scheduled maintenance stop. Emergency and other unscheduled stops may thus be avoided or at least reduced in number. The number of series connected groups 4 may be chosen in view of the maximum DC voltage which the ES arrangement is desirably able to output and/or able to handle as input. In accordance with the present invention, the ES arrangement 3 comprises at least two groups 4 of at least two modules 5 in each group. However, any number of series connected groups 4 may be used, each group having any number of parallel connected modules 5. For instance, the number of series connected ES groups may be at least 3 or at least 5, e.g. within the range of 3-10 or 5-10. The number of parallel connected ES modules 5 within each group 4 may be within the range of 2-5 or at least 3, e.g. within the range of 3-5. Typically, each of the series connected groups 4 has the same number of parallel connected modules 5, but it equally possible to include different number of modules 5 in different groups 4 if desired.

Figures 2, 3:
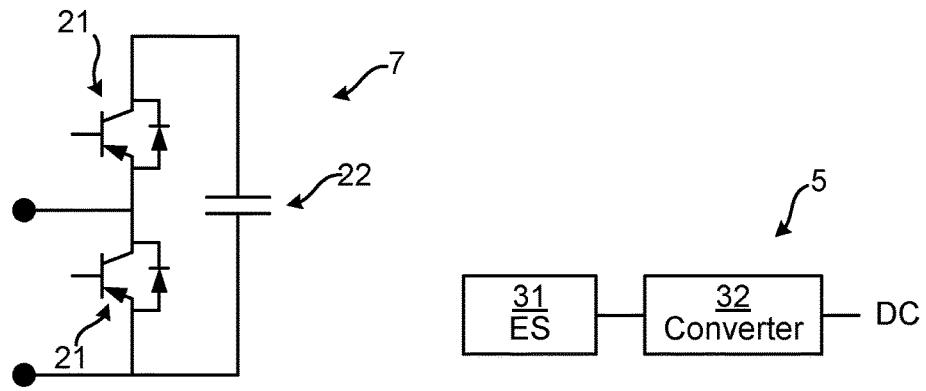
FIG. 2 is a schematic circuit diagram of an embodiment of a converter cell of an MMC of a converter interface, in accordance with some embodiments of the present invention.
FIG. 3 is a schematic block diagram of an ES module, in accordance with some embodiments of the present invention.

FIG. 2 illustrates a converter cell 7 of the converter interface 2. The cell 7 may have a full-bridge (also called bipolar) topology or a half-bridge (also called mono-polar) topology, as in the example of FIG. 2, depending on the application of the converter interface. In some embodiments, a hybrid topology may be used in a branch 6, comprising both at least one full-bridge cell 7 and at least one half-bridge cell 7. The converter cell 7 of FIG. 2 comprises a cell energy storage 22, e.g. comprising at least one capacitor or supercapacitor, and a plurality of semiconductor valves 21 forming the full- or half-bridge topology of the cell.

FIG. 3 illustrates an ES module 5. The ES module is configured to store electric energy received as DC power from the DC side of the converter interface 3 or to output DC power to the DC side of the converter interface 3, depending on in which direction the transfer of active power is currently performed. The energy is stored in an Energy Storage (ES) 31 which is interfaced by a bi-directional power electronic ES converter 32 configured for connecting the ES with a DC side of the converter interface 2. The ES module of the example of FIG. 3 comprises an ES 31 and the ES converter 32 which is interfacing the ES 31. Alternatively, the ES converter 32 may be external to the ES module 5, e.g. interfacing more that one of the ES 31 of the ES arrangement 3. However, typically, a plurality of ES converters 32 are comprised in the ES arrangement, e.g. at least one ES converter is comprised in each ES group 4, and is/are configured for interfacing each ES 31 of the ES group. The ES converter 32 may be either a DC/AC converter or a DC/DC converter, depending on whether the ES 31 operates with AC or DC. For instance, if the ES is or comprises a flywheel, the ES converter typically is a DC/AC converter, while if the ES is or comprises a battery or a fuel cell, the ES converter typically is a DC/DC converter. The ES converter may be any suitable bi-directional power electronic ES converter, e.g. a three-phase two-level converter which may be preferred in some embodiments.

In some embodiments of the present invention, an ES converter 32 may be used for more than one ES 31, i.e. a plurality of ES 31 are interfaced by a single combined ES converter 32 in the ES arrangement 3. For instance, a single (combined) ES converter may be used for all ES 31 of an ES group 4. Thus, a single respective combined ES converter 32 may be used for each ES group 4.

In accordance with the present invention, the ES converter 32 is comprised in the ES module 5. Thus, each ES 31 is associated with its own respective ES converter 32 in each module 5. There is thus no need for a large converter which e.g. operates back-to-back with the converter of the converter interface 2. For instance, each ES module 5 may comprise a housing, e.g. cabinet or the like, within which both the ES 31 and its ES converter 32 are housed, thus improving the modular feature of the ES modules 5. In some embodiments, the ES converter 32 may be integrated with the ES 31, e.g. by them both being controlled by means of the same control circuitry and/or by respective control circuitries of the ES and ES converter being integrated on the same circuit board. Additionally, or alternatively, the ES 31 and its ES converter 32 may be connected with a same user interface of the ES module 5.

In accordance with some embodiments of the present invention, a modular flywheel system for active and/or reactive power compensation is provided. The ES arrangement comprising the ES modules, connected both in series and in parallel as described herein, provides a DC voltage source and the converter interface 2 is used to interface the thus provided DC voltage source and the power grid 9. Compared to the power electronics-interfaced synchronous condenser, which is conventionally used, the proposed system may be advantageous by virtue of reduced power electronics cost and footprint, lower losses, higher modularity and increased redundancy and reliability.

With the availability of flywheels with magnetic bearings, rather than ball bearings, the losses due to friction can be kept low, also when using many relatively small flywheels as in embodiments of the present invention. It is thus preferred to use flywheels with magnetic bearings in the ES(s) 31, if flywheels are used. In addition to high efficiency (e.g., over 99%), flywheels with magnetic bearings may combine high rotational speed, high power output and high energy storage capacity. Examples of modular flywheels, with respective ES converters included with the flywheel in the same cabinet of the module, include flywheel modules from VYCON™, such as the models VDC XXE™ and VDC XXT™ which both operate within the rotational speed range of 36 750 to 14 000 rpm (rounds per minute). VDC XXE™ has a maximum power output of 300 kW (kilowatts) and a maximum energy storage capacity of 6000 kWs (kilowatt seconds), while VDC XXT™ has a maximum power output of 450 kW and a maximum energy storage capacity of 6250 kWs and can provide 400 kW for up to 13 s (seconds).

In some embodiments, the flywheel of each ES module 5 may have a maximum power output of at least 300 kW, e.g. within the range of 300-500 kW.

In some embodiments, the flywheel of each ES module 5 may have a maximum energy storage capacity of at least 5000 kWs, e.g. within the range of 5000-10 000 kWs, such as within the range of 6000-8000 or 6000-7000 kWs.

In some embodiments, the flywheel of each ES module 5 may be capable of operating with a rotational speed range above at least 10 000 rpm, e.g. which falls within the range of 10 000-50 000 rpm or 14 000-40 000 rpm.

In some embodiments, the flywheel of each ES module 5 may be able to output at least 400 kW for at least 10 s, e.g. for at least 11, 12 or 13 s.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A frequency support system arranged for providing frequency support to an AC grid, the system comprising:
   an energy storage, ES, arrangement; and
   a bi-directional DC/AC power electronic converter interface configured for connecting the ES arrangement with the grid;
   the ES arrangement comprising a plurality of series connected ES groups, each ES group including a plurality of parallel connected ES modules, each ES module including an ES interfaced by a bi-directional power electronic ES converter configured for connecting the ES with a DC side of the converter interface, wherein the ES comprises a flywheel.

2. The system of claim 1, wherein the flywheel has a magnetic bearing.

3. The system of claim 1, wherein the ES converter is a three-phase two-level converter.

4. The system of claim 1, wherein each ES module comprises a respective one of the ES converters.

5. The system of claim 4, wherein the ES converter is integrated with the ES.

6. The system of claim 4, wherein both the ES and the ES converter are contained within a same housing of the ES module.

7. The system of claim 1, wherein each ES group comprises a respective one of the ES converters, wherein the ES converter is interfacing each of the ES of the ES group.

8. The system of claim 1, wherein the plurality of series connected ES groups includes at least three series connected ES groups.

9. The system of claim 1, wherein the plurality of parallel connected ES modules includes at least three parallel connected ES modules.

10. The system of claim 1, wherein the converter interface comprises a Modular Multilevel Converter, MMC.

11. The system of claim 10, wherein the MMC has a double-star topology.

12. A method of providing frequency support to an AC grid, the method comprising:
    providing a frequency support system
    an energy storage, ES, arrangement; and
    a bi-directional DC/AC power electronic converter interface configured for connecting the ES arrangement with the grid;
    the ES arrangement comprising a plurality of series connected ES groups, each ES group including a plurality of parallel connected ES modules, each ES module including an ES interfaced by a bi-directional power electronic ES converter configured for connecting the ES with a DC side of the converter interface, wherein the ES is a flywheel;
    and, transferring electrical energy between the ES arrangement and the grid via the converter interface, to support an AC frequency of the grid.

13. The system of claim 2, wherein the ES converter is a three-phase two-level converter.

14. The system of claim 2, wherein each ES module comprises a respective one of the ES converters.

15. The system of claim 2, wherein each ES group comprises a respective one of the ES converters, which ES converter is interfacing each of the ES of the ES group.

16. The system of claim 2, wherein the plurality of series connected ES groups includes at least three series connected ES groups.

17. The system of claim 2, wherein the plurality of parallel connected ES modules includes at least three parallel connected ES modules.

* * * * *